United States Patent
Santos et al.

(10) Patent No.: US 9,926,430 B2
(45) Date of Patent: Mar. 27, 2018

(54) GREEN COALESCENT AGENT COMPOSITION CONTAINING MIXTURES OF MONOESTERS AND DIESTERS

(75) Inventors: Juliane Pereira Santos, Santo Andre (BR); Flavio Fumio Nakashima, Sao Paulo (BR); Fabio Rosa, Santo Andre (BR); Nadia Andrade Armelin, Sao Paulo (BR); Andre Luis Conde Da Silva, Sao Caetano do Sul (BR); Gilberto Alberto Silva, Santo Andre (BR)

(73) Assignee: OXITENO S.A. INDUSTRIA E COMERCIO, Sao Paulo (BR)

( * ) Notice: Subject to any disclaimer, the term of this patent is extended or adjusted under 35 U.S.C. 154(b) by 754 days.

(21) Appl. No.: 14/122,635

(22) PCT Filed: May 16, 2012

(86) PCT No.: PCT/BR2012/000142
§ 371 (c)(1),
(2), (4) Date: Nov. 26, 2013

(87) PCT Pub. No.: WO2012/159181
PCT Pub. Date: Nov. 29, 2012

(65) Prior Publication Data
US 2014/0096701 A1    Apr. 10, 2014

(30) Foreign Application Priority Data
May 26, 2011    (BR) ..................... 1102456

(51) Int. Cl.
*C08K 5/101*    (2006.01)
*C08K 5/10*    (2006.01)
(Continued)

(52) U.S. Cl.
CPC ............ *C08K 5/101* (2013.01); *B01D 17/047* (2013.01); *C08K 5/10* (2013.01); *C09D 7/001* (2013.01); *C08K 2201/014* (2013.01)

(58) Field of Classification Search
CPC .......... C08K 5/10; C08K 5/101; C08K 5/103; C09D 7/001
(Continued)

(56) References Cited

U.S. PATENT DOCUMENTS

| | | |
|---|---|---|
| 6,797,753 B2 | 9/2004 | Benecke et al. |
| 6,855,762 B1 | 2/2005 | Kroner et al. |

(Continued)

FOREIGN PATENT DOCUMENTS

| | | |
|---|---|---|
| BR | PI 0418990-6 A | 11/2007 |
| BR | PI0111905-2 B1 | 12/2010 |
| ES | 2299442 T3 | 10/2002 |

*Primary Examiner* — Bijan Ahvazi
*Assistant Examiner* — Thuy-Ai N Nguyen
(74) *Attorney, Agent, or Firm* — Jeffrey N. Townes; LeClairRyan

(57) ABSTRACT

The present invention relates to the use of mixtures of monoesters and diesters as coalescing agents. Monoesters and diesters according to the present invention were obtained by ethoxylation of fatty acids, and/or by direct esterification of fatty acids with monoethylene glycol or polyethylene glycol. Fatty acids used in the present invention have 4 to 22 carbon atoms and can be saturated or unsaturated, linear or branched.

In particular, the invention is directed to a composition of coalescing agents comprising: (i) mixtures of (RCOO(EO)$_n$H) monoesters and diesters; and, (ii) mixtures of (RCOO(EO)$_n$H) monoesters and diesters obtained from the ethoxylation of fatty acids, and/or direct esterification of fatty acids with ethylene glycol derivatives, and/or transesterification, (Continued)

wherein the monoesters are present in an amount of 90 to 10 mass % and diesters are present in an amount of 10 to 90 mass %.

9 Claims, 2 Drawing Sheets

(51) Int. Cl.
*B01D 17/04* (2006.01)
*C09D 7/00* (2018.01)

(58) Field of Classification Search
USPC .......................................................... 106/311
See application file for complete search history.

(56) References Cited

U.S. PATENT DOCUMENTS

| 7,705,084 | B2 | 4/2010 | Van De Mark et al. |
| 2005/0182168 | A1 | 8/2005 | Bloom et al. |
| 2008/0015296 | A1* | 1/2008 | Bloom ................... C08K 5/103 |
| | | | 524/313 |
| 2008/0139702 | A1 | 6/2008 | De Almeida et al. |
| 2010/0126384 | A1 | 5/2010 | Bene et al. |

* cited by examiner

# GREEN COALESCENT AGENT COMPOSITION CONTAINING MIXTURES OF MONOESTERS AND DIESTERS

CROSS-REFERENCE TO RELATED APPLICATIONS

This application is a national stage application, submitted under 35 U.S.C. § 371, of PCT Application No. PCT/BR2012/000142, filed on May 16, 2012, which claims priority to Brazilian Patent Application No. PI1102456-9, filed on May 26, 2011.

FIELD OF THE INVENTION

The present invention relates to the use of mixtures of monoesters and diesters as coalescing agents. In particular, the invention relates to coalescing agents compositions. The monoesters and diesters according to the present invention were obtained by ethoxylation of fatty acids and/or by esterification of fatty acids with monoethylene glycol or polyethylene glycol. Fatty acids used in the present invention have 4 to 22 carbon atoms and can be saturated or unsaturated, linear or branched.

BACKGROUND OF THE INVENTION

Coalescing agents are generally used in paints, varnishes and water-based adhesives. Coalescing agents act as a solvent and/or a plasticizer to the polymeric phase of paints, varnishes and adhesive formulations, diminishing the Tg thereof and favoring the formation of continuous and homogeneous films at several temperature and humidity conditions. Coalescing agents need to be stable in the presence of water and compatible with ingredients present in paints, varnishes and adhesive formulations. Specially, coalescing agents cannot destabilize polymer particles present in paints, varnishes and adhesive formulations. Coalescing agents should also be sufficiently volatile to be eliminated during drying of films, preferably after water evaporation.

The plasticization power of a coalescing agent, that is, the ability thereof in diminishing the Tg of a polymer, depends on solubility parameters of the coalescent and the polymer. The solubility parameter is associated with the cohesive energy of solvents and solutes. According to the Hansen model, the cohesive energy comprises the sum of contributions from non-polar or dispersive (Delta D) interactions, polar interactions (Delta P) and hydrogen bonds (Delta H). Usually, solubility of a solute in a given solvent is maximized when the solubility parameters are the same or close to each other. This rationale follows the general rule that like dissolves like. The similarity degree between solvent and solute solubility parameters is provided by the radius of interaction, which takes into account the differences between contributions of dispersive and polar interactions and hydrogen bonds of the solute and the solvent. If the radius of interaction of the solute-solvent combination is lower than the radius of the solubility sphere of the solute, the solvent is likely to dissolve the solute. Usually, water-insoluble coalescing agents having solubility parameters that are compatible with those of the polymer to be plasticized are more effective in reducing MFFT than water-soluble coalescing agents.

Currently, there is an increasing need for coalescing agents that meet the environmental legislation that controls emission of volatile organic compounds (VOC) to the atmosphere. According to European Directive legislation 2004/42/CE coalescing agents having boiling point of less than 250° C. are considered volatile organic compounds. The Green Seal Guidelines recommends using coalescing agents having boiling point greater than 280° C. Other features of coalescing agents that are valuable to manufacturers of paints, adhesives and varnishes and for the final consumer are: low odour, HAP-free, renewable raw material-derived coalescents having high vegetalization index and low $CO_2$ emission during the manufacture process. Table 1 below presents the VOC levels recommended by the European Directive Legislation 2004/42/CE for paints and varnishes.

TABLE 1

VOC levels recommended by the European Directive Legislation 2004/42/CE.

| Product subcategory | VOC threshold (g/L) Jan. 01, 2007 | VOC threshold (g/L) Jan. 01, 2010 |
|---|---|---|
| Matt coatings for interior walls and ceilings | 75 | 30 |
| Glossy coatings for interior walls and ceilings | 150 | 100 |
| Coatings for exterior walls of mineral substrate | 75 | 40 |
| Interior/exterior trim and cladding paints for wood, metal or plastic | 150 | 130 |
| Interior/exterior trim varnishes and woodstains including opaque woodstains | 150 | 130 |
| Interior and exterior minimal build woodstains | 150 | 130 |
| Primers | 50 | 30 |
| Binding primers | 50 | 30 |
| One-pack performance coatings | 140 | 140 |
| Two-pack performance products for a specific final use, namely, floors | 140 | 140 |
| Multi-coloured coatings | 150 | 100 |
| Decorative effect coatings | 300 | 200 |

Several molecules having alcohol and/or ester functionality are used as coalescing agents. Butyl glycol and 2,2,4-trimethyl-1,3-pentanediol monoisobutyrate (Texanol from Eastman Kodak) are the molecules most used as a coalescent. Due to its boiling point of 169-173° C. butyl glycol is considered a VOC by the European Legislation. Texanol, which has a boiling point of around 254° C. is not considered a VOC by the European Legislation. Nevertheless, Texanol does not meet the Green Seal Guidelines, which recommends that products used in civil construction be formulated with coalescing agents having a boiling point greater than 280° C.

Patent literature contemplates several reports mentioning the use of esters as coalescing agents.

US patent application US2010/0130645A1 to Elementis Specialties, entitled "VOC-Free Coalescing Agent", describes the use of monoesters of ethoxylated and/or propoxylated fatty acids as coalescing agents. The monoesters of the invention have structural formula $R_1COO[(EO)_x(PO)_y]_zH$. The R group contains from 6 to 22 carbon atoms, is linear and saturated, x and y may range from 0 to 5 and z ranges from 1 to 5.

The main esters are:
  Monoesters obtained from fatty acids and ethylene glycol or propylene glycol
  Esters obtained from fatty acids and ethene oxide and/or propene oxide
  Formulations containing at least 70% propylene glycol monolaurate Results of performance evaluation have shown that propylene monolaurate, which has a boiling point of >265° C., decreases MFFT (minimum film-forming temperature) of Rhoplex® ML200™ latex, MFFT of 6° C., with the same efficiency as Texanol coalescent.

U.S. Pat. No. 4,489,188 to Eastman Kodak Company, entitled "Coalescent-Containing Coating Composition", describes the use of monoesters obtained from the esterification of benzoic acid-derived acids and ethylene glycol and/or propylene glycol-derived ethers. The esters of the present invention were shown to be more effective in reducing MFFT of several styrene-acrylic latexes than Texanol.

US patent application US20070/0093579 to Curators of the University of Missouri, entitled "Water Born Film Forming Compositions", describes the use of esters of fatty acids derived from vegetable oils and methanol or glycol derivatives. The fatty acids used in esterification reactions are from corn, sunflower, soy and flaxseed oils. The esters thus obtained have hydrocarbon chains with at least two unsaturations. Glycol esters of fatty acids present in soy oil reduced MFFT of UCAR 430 latex in a similar manner as Texanol.

International Patent Application WO2008054992 to Velsicol Chemical Corporation, entitled "Aqueous Film Forming Compositions Containing Reduced Levels of Volatile Organic Compounds", describes the use of mixtures of benzoic acid monoesters and diesters and ethylene glycol or propylene glycol derivatives as coalescing agents. Paint films from formulations containing mixtures of diethylene glycol dibenzoate, dipropylene glycol dibenzoate and monobenzoates have greater wet abrasion resistance than films from paint formulations containing Texanol.

US patent application US2009/0198002 A1 to Rhodia INC entitled "Low VOC Coalescing Agents", describes the use of diesters of adipic, glutaric and succinic acids and alcohols comprising a hydrocarbon chain having 4 to 8 carbon atoms, including alcohols from fusel oil. Diesters obtained from glycol ethers and diacids are also encompassed in the invention. Diesters derived from glutaric and succinic acid and butanol or pentanol were more effective in reducing MFFT than Texanol.

Based on the above-mentioned examples, one notes that the use of esters as coalescing agents is extensively explored and among these esters the following are important: monoesters of ethoxylated and propoxylated acids, methyl and glycol esters of vegetable oil fatty acids, monoesters of benzoic acid and glycols, a mixture of monoesters and diesters of benzoic acid, glycols and diesters from diacids. Nevertheless, mixtures of monoesters and diesters originating from the ethoxylation of fatty acids and/or esterification of glycols and fatty acids have not been contemplated so far.

In view of that, it is evident that the field of the present invention, i.e., the use of mixtures of monoesters and diesters as coalescing agents, can still be developed.

SUMMARY OF THE INVENTION

The present invention relates to the use of mixtures of monoesters and diesters as coalescing agents. The monoesters and diesters according to the present invention were obtained by ethoxylation of fatty acids, and/or by direct esterification of fatty acids with monoethylene glycol or polyethylene glycol. Fatty acids used in the present invention have 4 to 22 carbon atoms and can be saturated or unsaturated, linear or branched.

DETAILED DESCRIPTION OF THE INVENTION

Figure 1:
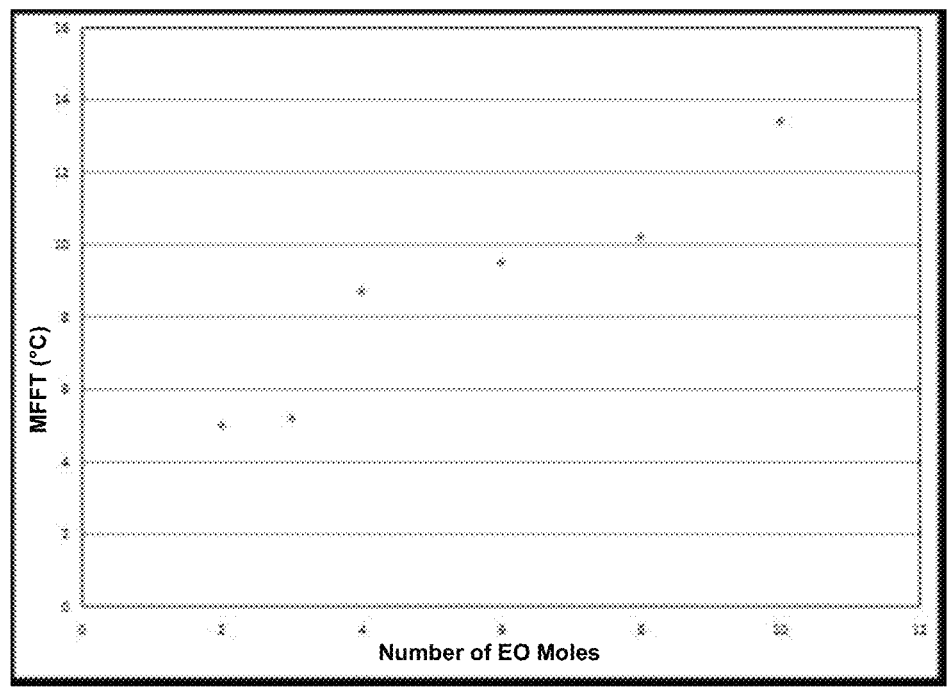
FIG. 1 shows the MFFT results of styrene-acrylic latex, MFFT of about 18° C., containing 3% of monoesters and diesters mixtures obtained from direct ethoxylation of fatty acids containing 8 and 10 carbon atoms.

The present invention describes the use of coalescing agents and/or plasticizers consisting of $(RCOO(EO)_nH)$ monoesters and diesters obtained from the ethoxylation of fatty acids and/or direct esterification of fatty acids with ethylene glycol derivatives and/or transesterification. The approximate mass composition of mixtures of monoesters and diesters is about 90 to 10% monoesters and 10 to 90% diesters.

In the present invention, the terms "coalescing agents" and "coalescent" refer to solvents capable of reducing MFFT (minimum film forming temperature), that is, acting as a plasticizer for the polymeric phase.

Coalescing agents listed in the present invention can be used in the formulation of paints, adhesives and varnishes containing latexes or polymer dispersions.

Said coalescing agents are preferably suitable for polymeric dispersions in water and formulations containing such dispersions.

Coalescing agents comprising mixtures of monoesters and diesters have a boiling point greater than 250° C., thereby meeting the European Directive legislation 2004/42/CE. Preferably, the coalescing agents of the present invention meet the Green Seal Guidelines, which recommends using coalescents having a boiling point greater than 280° C.

The ability of coalescing agents in plasticizing polymer particles, that is, in diminishing wet Tg of polymers, has been monitored via MFFT assays of latex films comprising amounts of the coalescing agents.

Wet abrasion resistance of coalescing agents-containing paint films has been monitored via washability tests.

Therefore, it is an object of the present invention to provide a composition of coalescing agents comprising:
(i) mixtures of $(RCOO(EO)_nH)$ monoesters and diesters; and,
(ii) mixtures of $(RCOO(EO)_nH)$ monoesters and diesters obtained from the ethoxylation of fatty acids and/or direct esterification of fatty acids with ethylene glycol derivatives and/or transesterification,
wherein monoesters are present in an amount of 90 to 10 mass % and diesters are present in an amount of 10 to 90 mass %.

In a preferred embodiment of the composition in accordance with the present invention, $RCOO(EO)_nH$ monoester molecules have n values, EO mole number, of from 1.0 to 10.

In another preferred embodiment of the composition in accordance with the present invention, the diesters contain 1.0 to 10 moles of EO.

In another preferred embodiment of the composition in accordance with the present invention, fatty acids have from 4 to 22 carbon atoms and can be saturated or unsaturated, linear or branched.

In a preferred embodiment of the composition in accordance with the present invention, coalescing agents are obtained from an optimized method to produce mixtures of monoesters and diesters, as described in table 1 above.

In another preferred embodiment of the composition in accordance with the present invention, coalescing agents have a boiling point greater than 250° C.

In another preferred embodiment of the composition in accordance with the present invention, coalescing agents can be used in formulations intended for applications requiring the formation of a film onto a substrate surface.

In another preferred embodiment of the composition in accordance with the present invention, coalescing agents can be used in the formulation of paints, adhesives and varnishes containing latexes or polymer dispersions. Preferably, latexes are selected from: styrene-butyl acrylate, styrene-butyl acrylate-acrylic acid, styrene-butyl acrylate-methacrylic acid, styrene-butadiene, styrene-butadiene-acrylic acid, styrene-butadiene-methacrylic acid, acrylonitrile-butadiene, acrylonitrile-butadiene-acrylic acid, acrylonitrile-butadiene-methacrylic acid, polyacrylates, polyacrylates-acrylic acid, polyacrylates-methacrylic acid, polyacrylates-carboxylic acids in a general manner and polyvinyl acetate.

In another preferred embodiment of the composition in accordance with the present invention, latexes can be used in civil construction, architectural paints, industrial paints, original paints, automotive repaints, paints and varnishes for packages in general.

In another preferred embodiment of the composition in accordance with the present invention, the concentration of mixtures of monoesters and diesters in formulations of paints, adhesives, varnishes and latexes can range from 0.1 to 50% in relation to the polymer content present in formulations or latexes.

The invention will now be described by means of the following examples, which are merely exemplary and should not be construed as a limitation on the scope of the invention.

Example 1

MFFT results of styrene-acrylic latex containing the coalescing agents of the present invention.

FIG. 1 shows MFFT results of styrene-acrylic latex, MFFT of about 18° C., containing 3% of monoesters and diesters mixtures obtained from direct ethoxylation of fatty acids containing 8 and 10 carbon atoms. The EO mole number used in ethoxylation of the C8C10 acid ranged from 2 to 10.

Example 2

MFFT of styrene-acrylic latex containing a coalescing agent of the present invention and Texanol.

Figure 2:
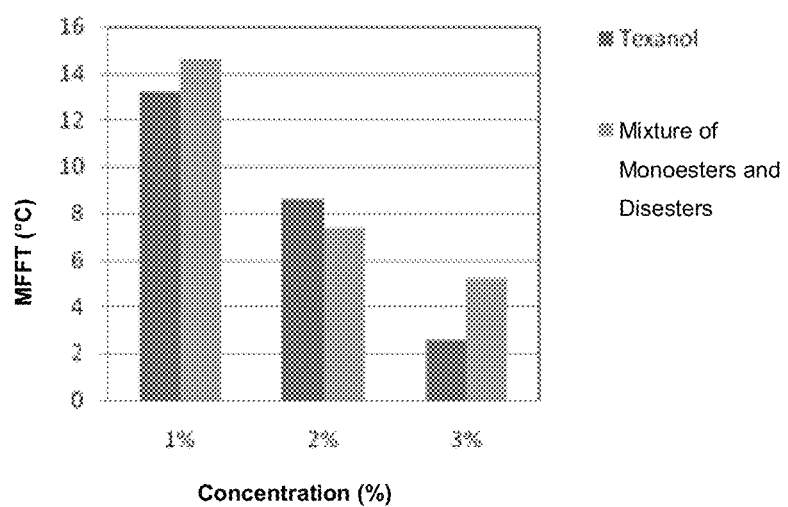
FIG. 2 shows the effect of the concentration of the mixture of monoesters and diesters and Texanol on MFFT of styrene-acrylic latex.

The effect of the concentration of the mixture of monoesters and diesters and Texanol on MFFT of styrene-acrylic latex is shown in FIG. 2. The mixture of monoesters and diesters used to generate the MFFT results of FIG. 2 is derived from ethoxylation of the C8C10 acid. The monoesters to diesters ratio of this mixture is presented in Table 2.

TABLE 2

Approximate composition of the mixture of monoesters and diesters by HPLC. The concentration of each component has been estimated based on its respective area in the chromatogram.

| Components | Mass concentration (%) |
|---|---|
| Monoesters | 60 |
| Diesters | 40 |

According to FIG. 2, the mixture of esters and diesters and Texanol has plasticization power to coalescing agent concentrations of from 1 to 2%.

Example 3

Boiling point and volatile content of the coalescing agent of the present invention.

The boiling point of the mixture of esters and diesters originating from the ethoxylation of caprylic and capric acids, which is used to generate the MFFT results of FIG. 2, is greater than 280° C. According to ASTM D 2369-10, the volatile content of the coalescing agent mentioned in FIG. 2 is of around 1.5%. The volatile content of Texanol is about 6%.

Example 4

DSC results of styrene-acrylic latex films containing 2% by weight of the mixture of esters and diesters of the present invention and Texanol.

Figure 3:
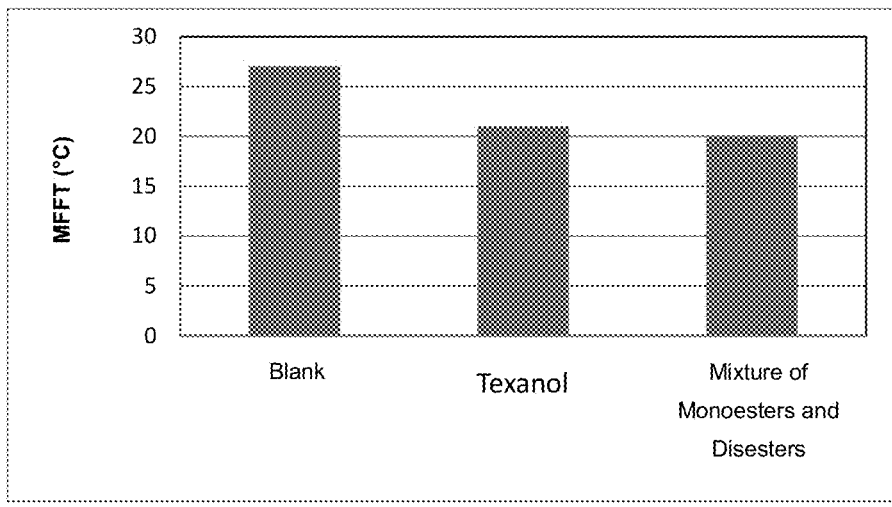
FIG. 3 shows the DSC results obtained for styrene-acrylic latex films containing 2% coalescing agent and dried for 7 days at a temperature of 25±2° C.

DSC results obtained for styrene-acrylic latex films containing 2% coalescing agent and dried for 7 days at a temperature of 25±2° C. are set forth in FIG. 3. The obtained glass transition temperatures (Tg) suggest that dried latex films retain a little quantity of coalescing agent.

Example 5

Washability results of paint films containing a mixture of esters and diesters of the present invention and Texanol.

TABLE 3

| Formulation of opaque paint | | |
|---|---|---|
| Items | Components | Mass (g) |
| 1 | Drinking water | 20.00 |
| 2 | Sodium nitrite | 0.05 |
| 3 | Sodium tetrapyrophosphate | 0.02 |
| 4 | Hydroxyethylcellulose | 0.25 |
| 5 | Monoethanolamine | 0.05 |
| 6 | Ultrasperse PA 44 | 0.35 |
| 7 | Ultrol L 10 | 0.35 |
| 8 | Anti-foaming | 0.10 |
| 9 | Bactericide | 0.15 |
| 10 | Fungicide | 0.15 |
| 11 | Titanium dioxide | 15.00 |
| 12 | Kaolin | 4.00 |
| 13 | Natural calcium carbonate | 5.00 |
| 14 | Precipitated calcium carbonate | 8.00 |
| 15 | Agalmatolite | 4.00 |
| 16 | Styrene-acrylic latex (MFFT ~18° C.) | 20.00 |
| 17 | Anti-foaming | 0.15 |
| 18 | Coalescing agent (described in Table 3) | 1.20 |
| 19 | MEA | 0.15 |
| 20 | Primal RM-5 | 1.20 |

TABLE 3-continued

Formulation of opaque paint

| Items | Components | Mass (g) |
|---|---|---|
| 21 | Primal TT 935 | 0.40 |
| 22 | Drinking water | 19.43 |
| | Total mass of paint with coalescing agent | 100.00 |

Figure 4:
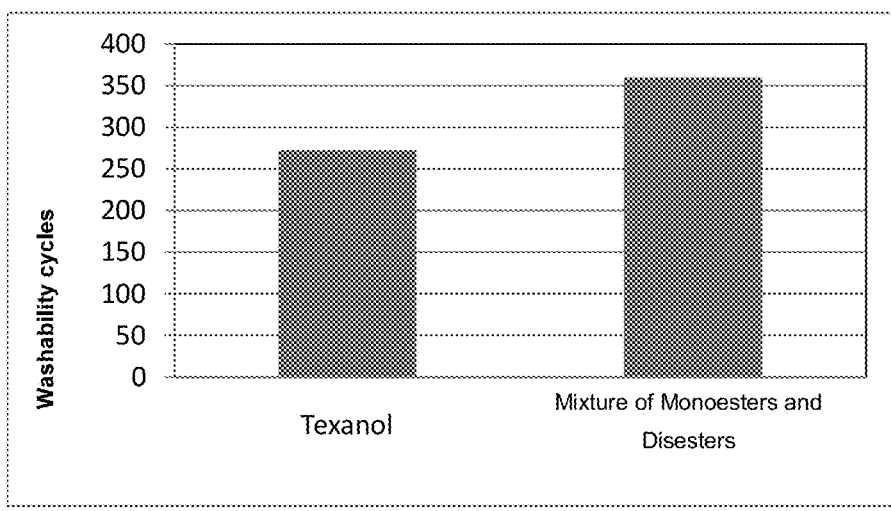
FIG. 4 shows the washability results obtained for opaque paints described in Table 3, containing Texanol and the mixture of esters and diesters as coalescing agents.

The washability results obtained for opaque paints described in Table 3, containing Texanol and the mixture of esters and diesters as coalescing agents, are depicted in FIG. 4.

Washability results suggest that opaque paint films containing the composition of coalescing agents of the present invention are more resistant to wet abrasion than opaque paints films containing Texanol.

The invention claimed is:

1. A composition of coalescing agents, comprising: a fatty acid glycol ester composition consisting essentially of
    (i) mixtures of (RCOO(EO)nH) monoesters and diesters; and,
    (ii) mixtures of (RCOO(EO)nH) monoesters and diesters; wherein the monoesters and diesters are obtained from the ethoxylation of fatty acids and/or direct esterification of fatty acids with ethylene glycol derivatives and/or transesterification of esters of fatty acids with ethylene glycol derivatives, wherein
    each R is independently an aliphatic chain having from 3 to 21 carbon atoms, and is saturated or unsaturated, linear or branched, EO is an ethoxy group, n is from 1.0 to 10; and wherein the total monoesters are present in an amount of 60 to 10 mass % and the total diesters are present in an amount of 40 to 90 mass %, wherein the mixture (i) is different from the mixture (ii).

2. The composition of claim 1, wherein the composition of the coalescing agents are obtained from an optimized method to yield mixtures of monoesters and diesters that allow formulating water-based paints with volatile organic compounds (VOC) content that complies with VOC limits of European Directive 2004/42/CE.

3. The composition of claim 1, wherein the composition of the coalescing agents have a boiling point greater than 250° C.

4. The composition of claim 1, wherein the composition of the coalescing agents are used in formulations intended for applications requiring the formation of a film onto a substrate surface.

5. The composition of claim 1, wherein the composition of the coalescing agents are used in formulations of paints, adhesives and varnishes containing latexes or polymer dispersions.

6. The composition of claim 5, wherein the latexes or polymer dispersions are selected from the group consisting of styrene-butyl acrylate, styrene-butyl acrylate-acrylic acid, styrene-butyl acrylate-methacrylic acid, styrene-butadiene, styrene-butadiene-acrylic acid, styrene-butadiene-methacrylic acid, acylonitrile-butadiene, acrylonitrile-butadiene-acrylic acid, and acrylonitrile-butadiene-methacrylic acid, polyacrylates, polyacrylates-acrylic acid, polyacrylates-methacrylic acid, polyacrylates-carboxylic acids, and polyvinyl acetate.

7. The composition of claim 5, wherein the latexes are used in civil construction, architectural paints, industrial paints, original paints, automotive repaints, or paints and varnishes for packages.

8. The composition of claim 5, wherein the concentration of the mixture of the total monoesters and the total diesters used in the formulations of paints, adhesives, lacquers and latexes ranges from 0.1 to 50 mass % in relation to the content of the latexes or the polymer dispersions present in the formulations.

9. The composition of claim 1, wherein the coalescing agents are obtained from HAP-free renewable raw material, and have high vegetalization index and low $CO_2$ emission during preparation of the coalescing agents.

* * * * *